United States Patent [19]
Kammerer et al.

[11] Patent Number: 5,210,530
[45] Date of Patent: May 11, 1993

[54] NETWORK MANAGEMENT INTERFACE WITH INTERNAL DSD

[75] Inventors: Gerald A. Kammerer, Wrentham, Mass.; Paul M. Piekarski, Cranston, R.I.; Robert W. Coia, North Attleboro, Mass.

[73] Assignee: Codex Corporation, Mansfield, Mass.

[21] Appl. No.: 638,297

[22] Filed: Jan. 4, 1991

[51] Int. Cl.$^5$ .............................................. H04Q 5/00
[52] U.S. Cl. .............................. 340/825.08; 340/825.5; 375/8; 379/98
[58] Field of Search .................... 340/825.5 X, 825.08, 340/825.07, 825.06; 375/8 X; 379/93, 98 X; 370/30, 95.2, 85.8

[56] References Cited

U.S. PATENT DOCUMENTS

| | | | |
|---|---|---|---|
| 4,346,440 | 8/1982 | Kyu et al. | 364/DIG. 1 |
| 4,663,748 | 5/1987 | Karbowiak et al. | 340/825.5 |
| 4,715,044 | 12/1987 | Gartner | 375/8 |
| 4,858,230 | 8/1989 | Duggan | 370/95.2 |
| 4,882,580 | 11/1989 | Teranishi et al. | 340/825.5 |
| 4,905,229 | 2/1990 | Kato | 340/825.5 |

OTHER PUBLICATIONS

2520/2540 Series Modem User's Manual, Codex Corp. Jan. 1987 Publ. No. 08556, Chapters 4 and 6.

*Primary Examiner*—Donald J. Yusko
*Assistant Examiner*—J. E. Giust
*Attorney, Agent, or Firm*—Darleen J. Stockley

[57] ABSTRACT

Apparatus for interfacing a network manager to a network of communication devices over a single communications channel of a plurality of signals is disclosed. Each communication device of the network is uniquely assigned a poll address for communication selection by the network manager which is operative to establish communication with a communication device of the network by transmitting the poll address thereof over the single communication channel. The network of communication devices are coupleable together in a daisy chain through input and output port circuits thereof to form the single communications channel. The input port circuit of each communications device receives and transmits signals from and to the single communications channel upstream of its position in the daisy chain and the output port circuit of each receives and transmits signals from and to the single communications channel downstream of its position in the daisy chain. In addition, the input port circuit of the communication device in the first position of the daisy chain is coupleable to the network manager for receiving signals, including the poll address, therefrom and for transmitting signals thereto. Each communication device further includes a control circuit which is coupleable to both the input and output port circuits thereof for governing the receiving and transmitting operations of each based on the poll address transmitted over the single communications channel by the network manager.

12 Claims, 5 Drawing Sheets

FIG. 6B

NETWORK MANAGEMENT INTERFACE WITH INTERNAL DSD

BACKGROUND OF THE INVENTION

The present invention relates to network management in general, and more particularly to an interface of a network manager to a network of communication devices in which an input and an output port of the devices are coupled together in a daisy chain to form a single communications channel.

Generally, wide area type dial modem networks use a network manager to monitor the status of a pool or network of modems to determine malfunctioning modem(s) and to take steps to circumvent selection of the malfunctioning modem(s), for example, so that proper operation of the network may continue. The network manager may be local to the modem pool or be coupled through a lease line connection from a remote location via a public system telephone network (PSTN).

A problem arises in interfacing the network manager with each pool of modems which may be in the hundreds. It would be cost prohibitive to couple each modem of the pool to the network manager through a separate channel, like a EIA 232 interface, for example. In small pools of modems, a special Y cable is used to couple up to four modems to the network manager using a modified EIA 232 interface. For larger modem pools, an external digital sharing device (DSD) is used to couple N modems to the network manager using a separate DSD port for each modem. The first method, of course, is limited to a physical connection of only four modems to an input port of the network manager which is capable of handling a much larger number of modems from a load point of view. Further, while the second method using the special external DSD permits many modems to interface with a single port of the network manager, each port connection of the DSD is very costly. The same problems are encountered in the cases of remotely located modem pools, but are additionally compounded somewhat because crossover cabling is needed for coupling a remote master which receives signals from the network manager through the PSTN, for example, to the remote pool of modems using either the foregoing described first or second method.

It is desired to simplify the interface cabling needs between the network manager and its pool of modems by eliminating Y cabling and crossover cabling and further, reduce costs by eliminating any need for an external DSD unit. The present invention provides an interface between the network manager and a pool of modems which achieves these objectives.

SUMMARY OF THE INVENTION

In a network of communication devices in which each communication device is uniquely assigned a poll address for communication selection by a network manager, the communication devices communicate amongst each other over a single communications channel of a plurality of signals. The network manager is operative to establish communication with a communication device of the network by transmitting the poll address thereof over the single communications channel.

In accordance with the present invention, apparatus for interfacing the network manager to the network of communication devices includes subapparatus of each communication device comprising: input port means; output port means and control means. The network of communication devices is coupleable together in a daisy chain through the input and output port means thereof to form the single communication channel. The input port means receives and transmits signals from and to the single communications channel upstream of its position in the daisy chain. The output port means receives and transmits signals from and to the single communications channel downstream of its position in the daisy chain. Further, the input port means of the communication device in the first position of the daisy chain is coupleable to the network manager for receiving signals, including the poll address, therefrom and for transmitting signals thereto. Still further, the control means is coupled to both the input and output port means for governing the receiving and transmitting operations of each based on the poll address transmitted over the single communications channel by the network manager.

In another aspect of the present invention, the network manager may be located at a remote location from the network of communication devices and be operative to communicate with the network over a communication medium. In connection with this aspect, each device includes a communication port means which is coupleable to the network manager through the communication medium and the control means is responsive to a set signal for establishing a link between the communication port means and the input/output port means so the network manager can transmit and receive signals to and from the single communications channel through the communication port means and input/output port means link of a communication device which has its communication port means coupled to the communication medium of the network manager.

In yet another aspect of the present invention, the network of communication devices comprises a plurality of nests of communication devices with the devices of each nest communicating with each other over a communication bus of a plurality of signals. In this aspect, the subapparatus of each communication device includes bus port means for receiving and transmitting signals from and to the corresponding nest communication bus and the control means is responsive to a bus set signal for establishing a link between the input port means and the bus port means so that the network manager can transmit and receive signals to and from the corresponding nest communication bus through the input port means and bus port means link of a communication device which has its input port means coupled to the single communications channel.

DESCRIPTION OF THE PREFERRED EMBODIMENT

Figure 1:
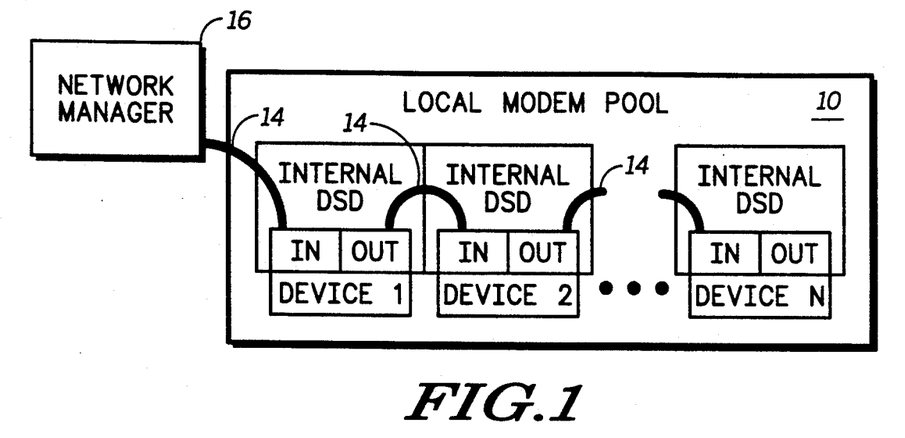
FIG. 1 is a block diagram illustrating an interface between a network manager and a network of communication devices over a single communication channel in accordance with one aspect of the present invention.

FIG. 1 is a block diagram illustrating an interface between a network manager and a network of communication devices over a single communication channel in accordance with one aspect of the present invention. The communication devices used for the present embodiment are conventional modems and are labeled Device 1, Device 2, . . . , Device N in a local network or modem pool 10. Each device includes an input port labeled "IN" and an output port labeled "OUT" and control logic (not shown) which constitute an internal data sharing device (DSD) as sub apparatus of the interface. The network of communication devices are coupleable together in a daisy chain through the input and output ports thereof to form the single communication channel 14 comprised of a plurality of signals which will be described in greater detail herebelow. The input port of device 1 which is in the first position of the daisy chain is coupleable to a network manager 16 over the single communication channel 14. The network manager 16 may be of the type manufactured by Codex Corporation bearing Model No. 9300/9800, for example.

In the present embodiment, each communication device 1-N of the network 10 is uniquely assigned a poll address for communication selection by the network manager 16 which is operative to establish communication with a communication device of the network 10 by transmitting the poll address thereof over the single communication channel 14. The input port of device 1 receives signals, including the poll address, from the network manager 16 and also transmits reply signals back to the network manager over the channel 14. Operationally, each input port of a communication device receives and transmits signals from and to the single communication channel 14 upstream of its position in the daisy chain and the output port of each communication device receives and transmits signals from and to the single communication channel 14 downstream of its position in the daisy chain.

Figure 2:
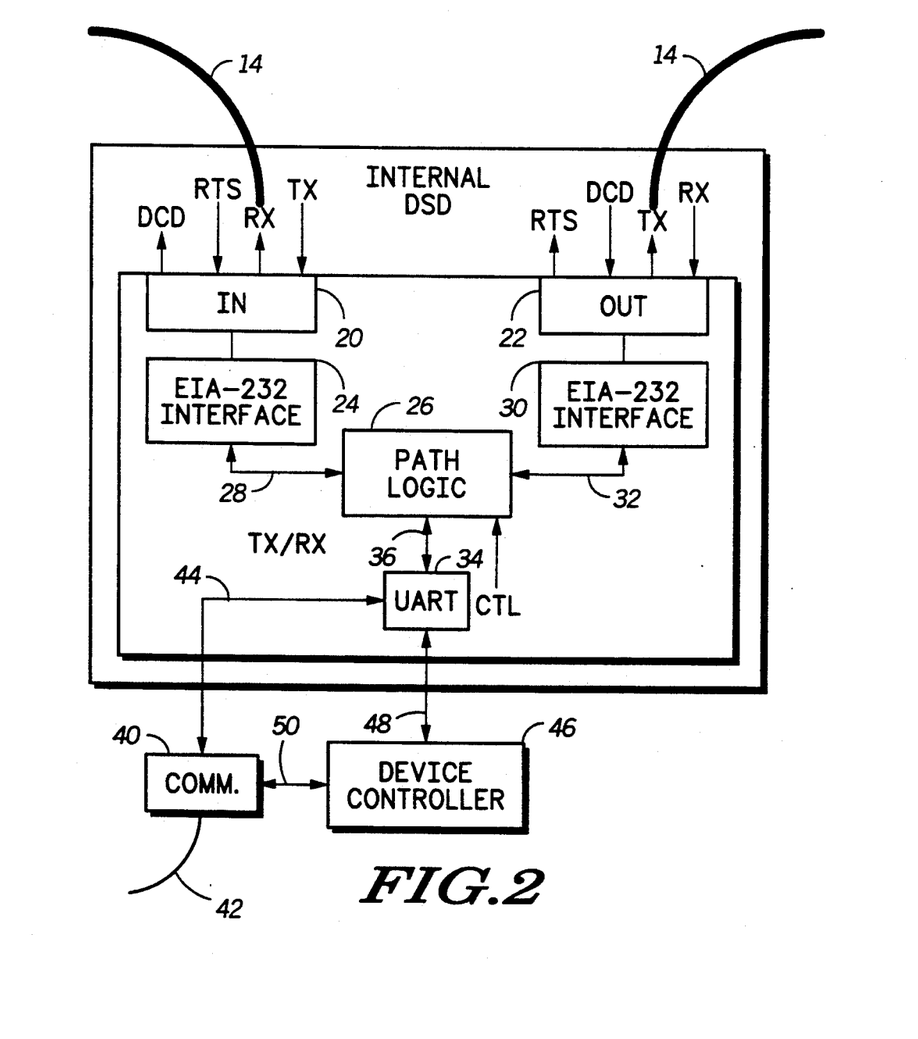
FIG. 2 is a block diagram schematic of an internal data sharing device suitable for use in the communication devices of FIG. 1.

The block diagram schematic of FIG. 2 depicts an internal DSD suitable for use in the communication devices described in connection with the embodiment of FIG. 1. In the present embodiment, the single communication channel 14 operates in an asynchronous, half duplex, master/slave protocol using the EIA232 standard and comprises the following signal lines: transmit data (TX) which carries signals, including the poll address, of the network manager 16 to the managed communication devices 1-N, receive data (RX) which carries signals from the managed communication devices 1-N to the network manager 16, request to send (RTS) which is a signal asserted by the network manager before it begins transmission of a data signal stream to the communication devices, and data carry detect (DCD) which is a signal asserted by a communication device before the device begins transmission of data (replies) to the network manager 16.

In operation, each internal DSD of a communication device allows EIA 232 signals initiated by the network manager 16 to be retransmitted downstream to other communication devices until the management signals reach the intended communication device as determined by the poll address thereof. Likewise, the addressed communication device (slave) responds to the network manager, in the present case, with its information signals which are retransmitted by each communication device DSD interface upstream until the reply reaches the network manager 16. Note that the cabling limitations of the present network interfaces as described in the Background section hereabove are eliminated by the internal DSD's of the communication devices 1-N.

Referring to FIG. 2, at each communication device 1-N, the signals of channel 14 are connected to the internal DSD portion thereof through a physical input connector 20 and a physical output connector 22 both of which may be standard EIA 232 connectors commonly referred to as micro-DIN connectors, for example. Accordingly, the managed communication devices are daisy chained from one to the other with a single cable 14 between each device to carry the management information of the network manager 16 and managed devices 1-N. Continuing on, the signals from the input connector 20 are coupled to an EIA 232 interface circuit 24 and thereafter coupled to a path logic circuit 26 over signal lines 28. Similarly, the signals from the output connector 22 are coupled through another EIA 232 interface circuit 30 to the path logic circuit 26 over signal lines 32. In addition, the path logic circuit 26 coordinates its logic operations with a universal asynchronous receive transmit (UART) circuit 34 using signal lines 36.

Still further, each of the communication devices 1-N includes a conventional communication port 40 for receiving and transmitting signals over a communication medium 42 which may be a telephone line from the PSTN, for example. The port 40 is also coupled to the UART 34 over signal lines 44. Both, the conventional communication port 40 and the UART 34, may be controlled by a conventional device controller 46 which may be of the type manufactured by Motorola bearing Model No. MC68302, for example. The controller 46 interfaces with the UART 34 using the signal lines 48 and interfaces with the communication port 40 using signal lines 50.

Figure 6A:
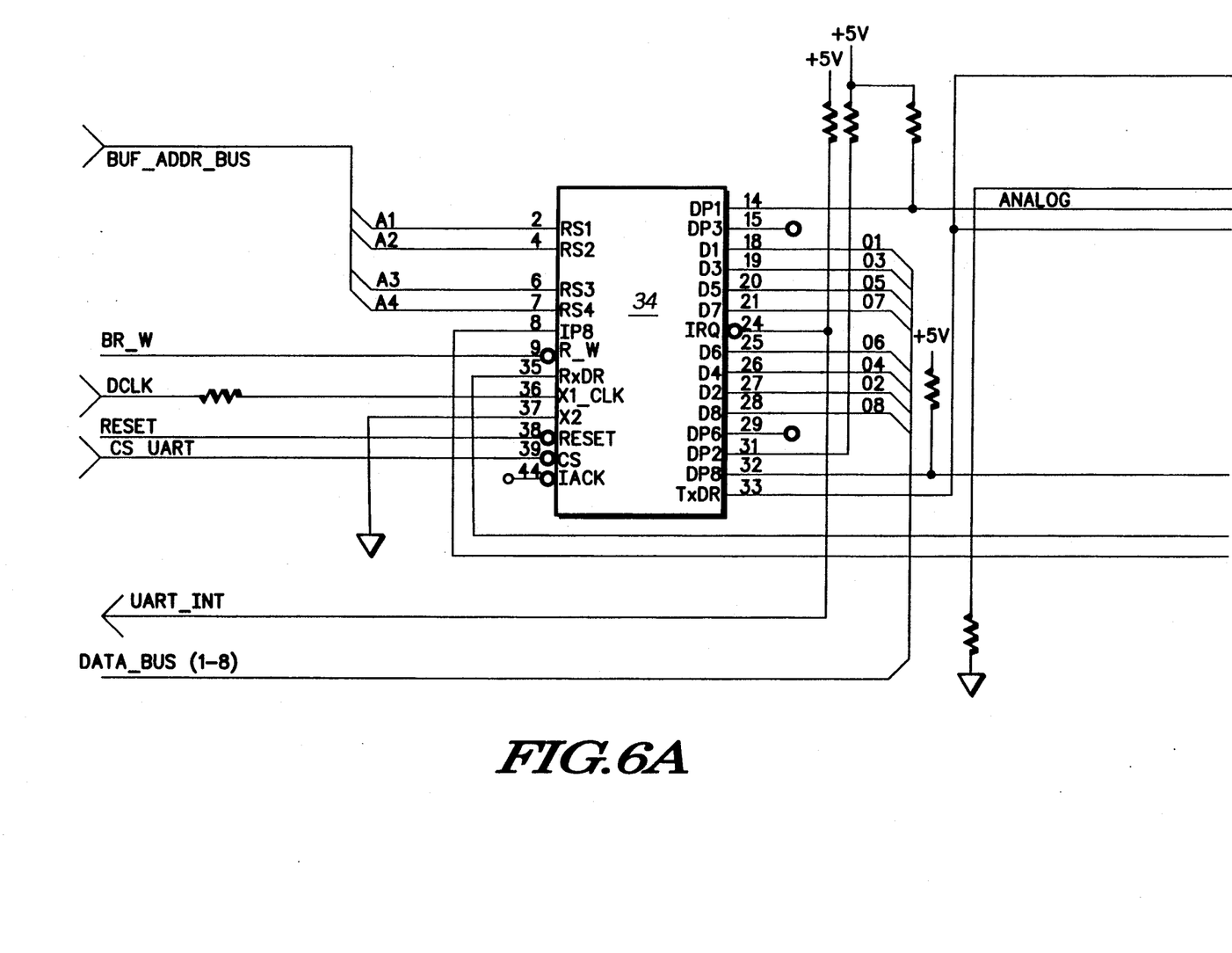
FIGS. 6A and 6B together depict a circuit schematic of an internal data sharing device suitable for use in the communication devices of the various embodiments of the foregoing described figures.
Figure 6B:
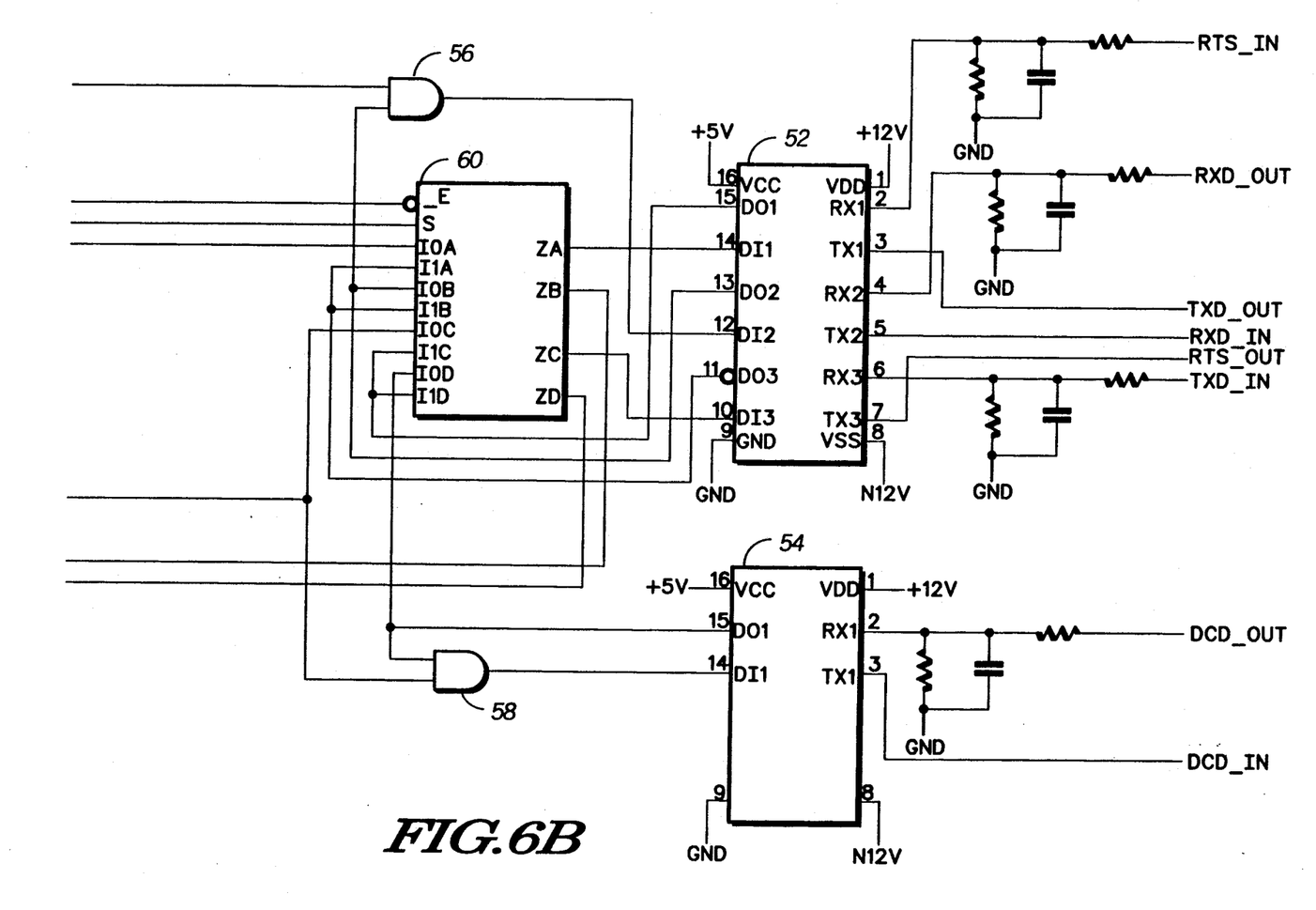

A circuit schematic of an internal DSD suitable for use in each communication device is shown in FIGS. 6A and 6B. The signals shown to the left of FIG. 6A represent the control, address and data bus lines which couple the UART 34 to the device controller 46. The UART used in the circuit embodiment is of the type manufactured by Motorola bearing Model No. MC68681, for example. In addition, at the right of FIG. 6B are the interface signal lines of channel 14. Those signals designated by "IN" are coupled through the in connector 20 and those signals designated by "OUT" are coupled through the out connector 22. In the present embodiment, the circuitry of the internal DSD is transistor-transistor-logic (TTL) which is driven by the voltage potentials of +5 V and ground. The EIA 232 signal levels over channel 14 are between +12 V and −12 V. Accordingly, the channel signals passing through to the path logic 26 from the in or out connectors 20 and 22 are level shifted by the interface circuits 24 and 30. In the circuit embodiment of FIG. 6B, this function is performed by voltage level translators 52 and 54 which may be of a type bearing Model No. 145406, for example. Further in the circuit embodiment of FIG. 6B, the path logic 26 comprises AND gates 56 and 58 and a multiplexer circuit 60 which may be of the type bearing Model No. 74AC157, for example. In the mode of operation described in connection with the embodiment of FIG. 1, the multiplexer circuit 60 is controlled such that the inputs I1A, I1B, I1C and I1D are connected to the outputs ZA, ZB, ZC and ZD, respectively, using the set signal S generated through the UART34. Still further, the AND gates 56 and 58 in the present circuit embodiment are utilized as negative logic OR gates.

In operation, digital network management information is originated by the network manager 16 and conducted over the signal lines of the channel 14 to the first communication device 1 in the daisy chain as shown in FIG. 1. The channel signals are conducted through the in connector 20, interface/translator circuits 52 and 54 to the path logic 26. The RTS IN and TXD IN signals are routed through the multiplexer circuit 60 and regenerated as TXD OUT and RTS OUT signals which are conducted through the interface/translator circuits 52 and 54 and out connector 22 to the channel 14 for downstream distribution. These same signals are also routed to the inputs IP8 and RXDR of the UART 34 for monitoring the poll address thereof.

More specifically, the address is accepted via RXDR and stored in one or more bytes of storage of the UART 34. Once stored, the UART 34 transmits an interrupt signal to the device controller 46 indicating that a poll address has been accepted and is ready to be processed. In turn, the device controller 46 sets the control signal BR-W to the read state, then accesses the byte register utilizing the address lines A1-A4 and reads the poll address bytes over the data bus lines. Within the device controller 46 is a nonvolatile memory storing the digital data bytes of the unique poll address of the communication device. A comparison operation is conducted by the device controller 46 and if there is agreement in the comparison, the communication device recognizes that it is the intended communication device to communicate with the network manager 16 and thereafter, asserts the DCD control signal and replies to the network manager 16 by sending receive data back to the network manager 16 over the channel 14 via the path logic 26, interface 24 and in connector 20.

More specifically, after comparison agreement, the device controller 46 controls the UART 34 to initiate a DCD signal through the output port DP8. The DCD signal generated by the UART 34 is coupled through the AND gate 58, translator 54, and input connector 20 to the channel 14. Thereafter, reply data is conducted from the device controller 46 by setting the control signal BR-W to the write state, addressing the appropriate byte registers of the UART34 utilizing the address lines A1-A4 and conducting the digital data over the data bus for storage in the byte registers of the UART 34. The data stored in the byte storage memory of the UART34 is serialized and sequentially transmitted out of the TXDR port thereof, through the AND gate 56 and translator 52 to the signal line RXD-IN of the channel 14 via in connector 20.

Should the device controller 46 identify nonagreement in the poll address comparison, then no response is rendered by the device controller and the network management signals of the channel 14 are conducted through the internal DSD of the communication device to the internal DSD of the next downstream communication device in the daisy chain. Accordingly, should that next communication device determine it is the intended device according to the received poll address, it shall respond in the same manner as described hereabove and transmit signals back to the network manager 16 through each of the internal DSD's upstream thereof. For example, referring to the circuit of FIG. 6B, a DCD-Out signal conducted over channel 14 from a downstream communication device is passed through the connector 22, translator 54 and through the gate 58 in which it is regenerated as the DCD-In signal and passed back through the translator 54 to the in connector 20 and upstream through channel 14. Similarly, the reply data information from a downstream communication device is conducted over the channel 14 through the signal line RXD-Out which is conducted to the out connector 22, translator 52 and gate 56 wherein it is regenerated as signal RXD-In and conducted back through the translator 52 to the connector 20 and out over the channel 14 to the next upstream communication device or network manager 16.

In this manner, the input port circuitry of each of the internal DSD circuits receives and transmits signals from and to the communication channel 14 upstream of its position in the daisy chain and the output port circuits thereof receive and transmit signals from and to the communication channel 14 downstream of its position in the daisy chain. The control logic circuitry is coupled to both the input and output port circuitry and governs the receiving and transmitting operations of each based on the poll address transmitted over the communications channel 14 by the network manager 16 as described above.

Figure 3:
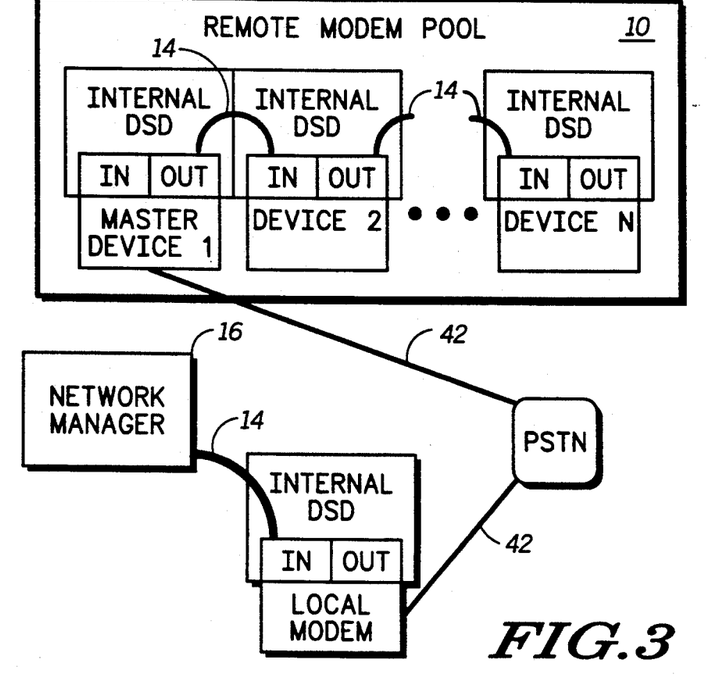
FIG. 3 is a block diagram illustrating another aspect of the present invention in which the network manager is remote from a network of communication devices and communicates therewith over a communication medium.

It is recognized that the network manager 16 may not always be local to the modem pool being managed, but in some cases be remote therefrom. In such instances, the network manager 16 is operative to communicate with the network or pool of modems 10 over a communications medium such as a telephone line of a PSTN, for example. A block diagram illustrating a suitable embodiment for this aspect of the present invention is shown in FIG. 3. Referring to FIG. 3, the network manager 16 is coupled to the input port circuit of a local modem over channel 14. However, the channel signals are converted by the local modem for transmission through its communication port over the telephone line 42 via the PSTN. In turn, a master device at the remote modem pool 10 receives the channel signals from the telephone line 42 through its communication port 40. In the present embodiment, the master device is the communication device in the first position of the daisy chain of communication devices at the remote location.

In the master device, the device controller 46 thereof generates a set signal S to its multiplexer circuit 60 as described in connection with the circuit schematic of FIG. 6B to establish a link between the communication port 40 and the input/output port circuits so that the network manager 16 can transmit and receive signals to and from the single communication channel 14 at the remote location through the communication port and input/output port link of the master communication device via communication medium 42. More specifically, the multiplexer circuit 60 responds to the set signal or master control operation by switching connection of output signals ZA, ZB, ZC, and ZD from respective input signals I0A, I0B, I0C, and I0D to I1A, I1B, I1C and I1D.

In this mode of operation as the channel signals are received by the communication port 40 of the master device, they are conducted to and stored in the UART34 as controlled by the device controller 46. In addition, the device controller 46 controls the UART34 to set the control signal RTS via port DP8 and transmits the stored data via port TXDR through the multiplexer switch 60, translator 52 and output connector 22 to the channel 14. Both signals RTS and TX are conducted over channel 14 to downstream communication devices. When the reply data (RX) is received by the master device from the downstream communication devices over channel 14, the DCD-Out and RXD-Out signals are conducted through the translators 52 and 54, through the multiplexer circuits 60 and to the pins IP8 and RXDR, respectively, of the UART34. The received reply data information is stored in the UART34 until it is transmitted out through the communication port, as controlled by the device controller 46, to the telephone system and back to the network manager 16 via the local modem. The operation of the local modem at the location site of the network manager 16 is similar to that described for the master device hereabove.

It is further recognized that in other cases communication devices may be nested together in a backplane connection; in which case, the communication devices of each nest communicate with each other over a common communication bus of the nest backplane. Network management of the nests of communication devices, either locally or remote, may be performed in accordance with another aspect of the present invention. A block diagram schematic illustrating this aspect of the present invention is shown in FIG. 4.

Figure 4:
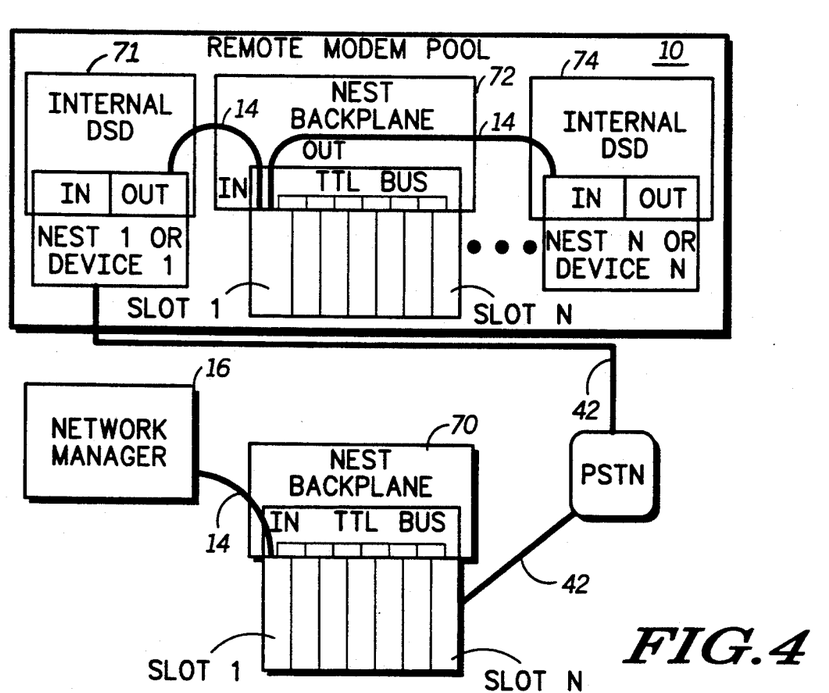
FIG. 4 is a block diagram illustrating yet another aspect of the present invention in which the network manager is interfaced with at least one nest of communication devices which communicate with each other over a common nest bus.
Figure 5:
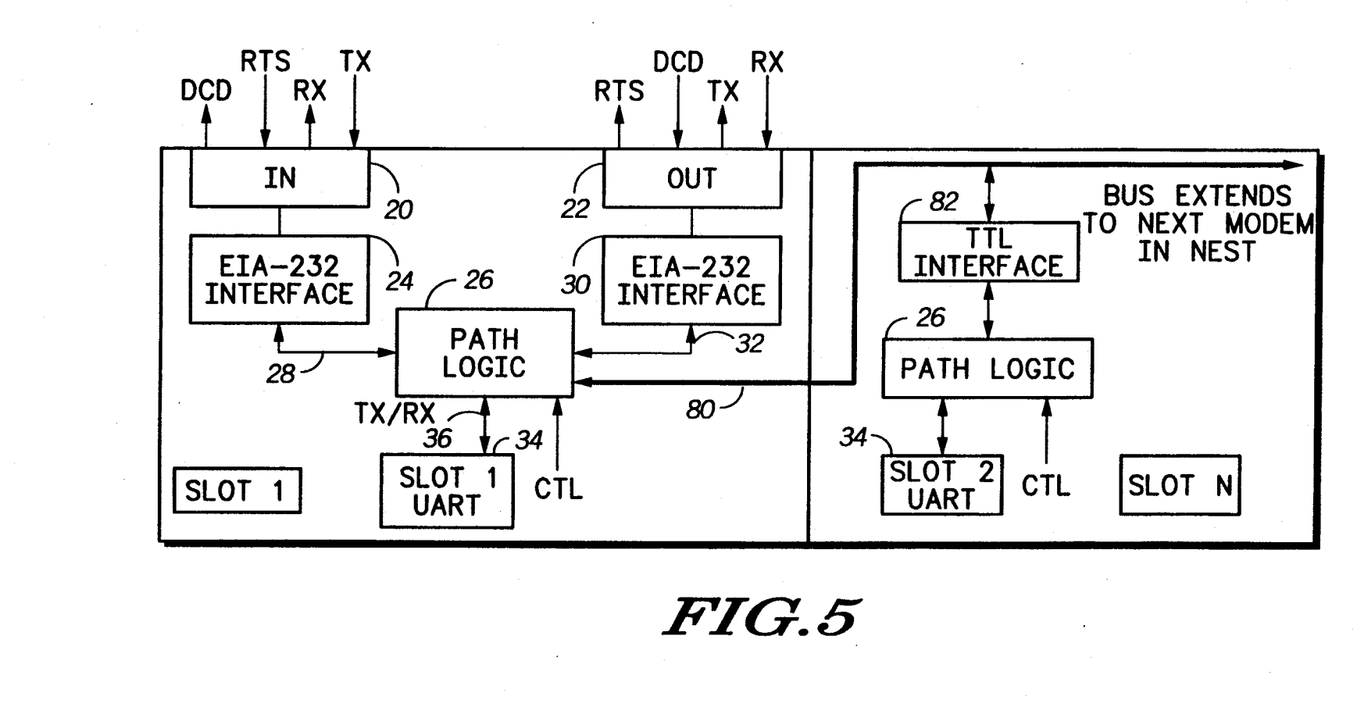
FIG. 5 is a block diagram schematic of an internal data sharing device suitable for use in the communication devices of the nests of the embodiment of FIG. 4.

Referring to FIG. 4, a local nest of communication devices is shown at 70 and remote nests of communication devices are shown at 71, 72, and 74 as part of the remote network 10. Each nest of communication devices are assembled through use of a card cage of slots 1-N and are coupled together through a backplane which may contain the communication bus for conducting the channel signals to the various communication devices of the nest. A nest which couples directly to the network manager 16 such as that shown at 70, for example, includes in a slot thereof, say slot 1, for example, a communication device modified to have a bus port circuit for receiving and transmitting signals from and to the corresponding nest communication bus. Accordingly, the channel signals originating from the network manager 16 are conducted over the channel 14 to the input port of the modified communication device and thereafter conducted to the other communication devices of the nest through the bus port circuit thereof. For this purpose, the control logic 26 of the modified communication device includes circuitry which is responsive to a bus set signal for establishing a link between the input port circuitry and the bus port circuitry so that the network manager can transmit and receive signals to and from the corresponding net communication bus through the input port and bus port circuit link thereof. The block diagram schematic of FIG. 5 depicts a suitable embodiment for use as the modified internal DSD of such a communication device.

Functional blocks which have already been described in connection with the embodiment of FIG. 2 are similarly numbered in the block diagram schematic of FIG. 5. Referring to FIG. 5, the path logic block 26 of the modified DSD includes circuitry which provides TTL level channel signalling to drive the nest communication bus 80. This signalling conducted over the bus 80 is similar to that which is conducted to the out connector 22, namely, TX, RX, DCD and RTS, for example. Since the communication devices of a nest are plugable into the backplane, there is no need for a EIA standard connector. Accordingly, the internal DSD's of the nest communication devices have only a TTL interface circuit 82. It is understood that the path logic and UART operations of blocks 26 and 34, respectively, remain the same as that described for the internal DSD embodiment of FIG. 2.

Should the network manager 16 desire to manage a remote network of modems 10, then one of the communication devices of the local nest backplane say the communication device of slot n, for example may become a master communication device as described in connection with the embodiment of FIG. 3. In this case, the channel signals are passed over the telephone line of the telephone network to another master communication device which is connected in a slot of the nest of communication devices like 71, for example, at the remote modem site. This remote master communication device may be similar to that described in connection with the embodiment of FIG. 5; in which case, it is capable of transmitting the channel signals out to the nest communication bus and also out through the output port over the communication channel 14 to a communication device of another nest, like the nest 72, for example, as shown in FIG. 4.

The master communication device of the nest 72 accepts the channel signals through the input port circuitry thereof and passes them through to both its output port circuitry and its bus port circuitry. The channel signals may be passed through the input and output port circuitry of a master channel device in other nests at the remote location until it gets to the final nest of a daisy chain, like the nest 74, for example. Each of the communication devices of each nest monitors the channel signals for its unique poll address and replies either through the corresponding communication bus and/or communication channel 14 back to the network manager 16 in a similar manner to that described hereabove. The circuit schematic embodiment described in connection with FIG. 6A and 6B may be easily converted by anyone skilled in the pertinent art to provide the bus port to drive the communication bus of its corresponding nest as well as driving the channel 14 through the output port thereof based on the functional description provided hereabove in connection with the embodiments of FIG. 4 and 5. No further specific description is believed necessary in this regard.

We claim:

1. Apparatus for interfacing a network manager to a network of communication devices over a single communications channel of a plurality of signals, each communication device of the network being uniquely assigned a poll address for communication selection by said network manger, said network manger operative to establish communication with a communication device of the network by transmitting the poll address thereof over the single communications channel, said apparatus comprising:

subapparatus of each communication device including:

input port means, where input refers to a logical control direction rather than hardware signal direction;

output port means, where output refers to a logical control direction rather than hardware signal direction, said network of communication devices being coupleable together in a daisy chain through the input and output port means thereof to form the single communications channel, said input port means for receiving and transmitting signals from and to said single communications channel upstream of its position in the daisy chain and said output port means for receiving and transmitting signals from and to said single communications channel downstream of its position in the daisy chain, said input port means of the communication device in first position of the daisy chain being coupleable to the network manager for receiving signals, including said poll address, therefrom and for transmitting signals thereto; and control means, coupled to both the input and output port means, for governing the receiving and transmitting operations of each based on the poll address transmitted over the single communications channel by the network manager.

2. The apparatus in accordance with claim 1 wherein the single communication channel includes the following signals:
(a) transmit data (TX),
(b) receive data (RX),
(c) request to send (RTS), and
(d) data carrier detect (DCD); and wherein the control means includes:
universal asynchronous receive transmit (UART) means for receiving the RTS and TX signals from the channel through the input port means and for originating and transmitting DCD and RX signals to the channel through the input port means;
first gate means for passing either the RX signal originated from the UART means or the RX signal received through the output port means to the RX signal of the channel through the input port means; and
second gate means for passing either the DCD signal originated from the UART means or the DCD signal received through the output port means to the DCD signal of the channel through the input port means.

3. The apparatus in accordance with claim 2 wherein the UART means includes storage memory for storing received data of the transmit signal TX, including the poll address.

4. Apparatus for interfacing a network manager to a network of communication devices which communicate among themselves over a single communications channel of a plurality of signals, said network manager located at a remote location from said network and operative to communicate with the network over a communication medium, each communication device of the network being uniquely assigned a poll address for communication selection by said network manager, said network manager operative to establish communication with a communication device of the network by transmitting the poll address thereof over the single communications channel, said apparatus comprising:

subapparatus of each communication device including:
input port means, where input refers to a logical control direction rather than hardware signal direction;
output port means, where output refers to a logical control direction rather than hardware signal direction, said network of communication devices being coupleable together in a daisy chain through the input and output port means thereof to form the single communications channel, said input port means for receiving and transmitting signals from and to said single communications channel upstream of its position in the daisy chain and said output port means for receiving and transmitting signals from and to said single communications channel downstream of its position in the daisy chain;
control means, coupled to both the input and output port means, for governing the receiving and transmitting operations of each based on the poll address transmitted over the single communications channel by the network manager; and
communication port means coupleable to the network manager through said communication medium thereof, wherein the control means includes means responsive to a set signal for establishing a link between said communication port means and input/output port means so that the network manager can transmit and receive signals to and from the single communications channel through the communication port means and input/output port means link of a communication device which has it s communication port means coupled to the communication medium of the network manager.

5. The apparatus in accordance with claim 4 wherein the single communication channel includes the following signals:
(a) transmit data (TX),
(b) receive data (RX),
(c) request to send (RTS), and
(d) data carrier detect (DCD); and wherein the control means includes:
universal asynchronous receive transmit (UART) means for receiving the RTS and TX signals from the channel through the input port means and for originating and transmitting DCD and RX signals to the channel through the input port means;
first gate means for passing either the RX signal originated from the UART means or the RX signal received through the output port means to the RX signal of the channel through the input port means; and
second gate means for passing either the DCD signal originated from the UART means or the DCD signal received through the output port means to the DCD signal of the channel through the input port means.

6. The apparatus in accordance with claim 5 wherein the UART means includes storage memory for storing received data of the transmit signal TX, including the poll address.

7. The apparatus in accordance with claim 5 wherein the control means includes a plurality of switches governed by the set signal to operate between a first mode and a second mode; wherein when in the first mode the UART means is connected to receive RTS and TX signals from the inport port means and to originate and transmit DCD and RX signals to the input port means; and wherein when in the second mode, the UART is connected to originate and transmit RTS and TX signals to the channel through the output port means and to receive DCD and RX signals from the channel through the output port means.

8. Apparatus for interfacing a network manager to a network comprising a plurality of nests of communication devices said communicating devices of each nest communicating with each other over a communications bus of a plurality of signals, said nests communicating with each other and said network manager over a single communications channel each communication device of the network being uniquely assigned a poll address for communication selection by said network manager, said network manger operative to establish communication with a communication device of the network by transmitting the poll address thereof over the single communications channel, said apparatus comprising:

subapparatus of each communication device including:

input port means, where input refers to a logical control direction rather than hardware signal direction;

output port means, where output refers to a logical control direction rather than hardware signal direction, said nests of communication devices being coupleable together in a daisy chain through the input and output port means thereof to form the single communications channel, said input port means for receiving and transmitting signals from and to said single communications channel upstream of its position in the daisy chain and said output port means for receiving and transmitting signals from and to said single communications channel downstream of its position in the daisy chain, said input port means of the communication device in first position of the daisy chain being coupleable to the network manager for receiving signals, including said poll address, therefrom;

control means, coupled to both the input and output ports means, for governing the receiving and transmitting operations of each based on the poll address transmitted over the single communications channel by the network manager; and bus port means for receiving and transmitting signals from and to the correpsonding nest communication bus, said control means including means responsive to a bus set signal for establishing a link between said input port means and said bus port means so that the network manager can transmit and receive signals to and from the corresponding nest communication bus through the input port means and bus port means link of a communication device which has its input port means coupled to the single communications channel.

9. The apparatus in accordance with claim 8 wherein the network manager is located at a remote location from at least one nest of communication devices and is operative to communicate with the nest over a communication medium; wherein each communication device includes a communication port means coupleable to the network manager through said communication medium; and wherein the control means of each device includes means responsive to a communication set signal for establishing a link between said communication port means and the bus port means thereof so that the network manager can transmit and receive signals to and from the nest communications bus through the communication port means and bus port means link of a communication device which has its communication port means coupled to the communication medium of the network manager.

10. The apparatus in accordance with claim 8 wherein the single communication channel includes the following signals:

(a) transmit data (TX),
(b) receive data (RX),
(c) request to send (RTS), and
(d) data carrier detect (DCD); and wherein the control means includes:

universal asynchronous receive transmit (UART) means for receiving the RTS and TX signals from the channel through the input port means and for originating and transmitting DCD and RX signals to the channel through the input port means;

first gate means for passing either the RX signal originated from the UART means or the RX signal received through the output port means to the RX signal of the channel through the input port means; and second gate means for passing either the DCD signal originated from the UART means or the DCD signal received through the output port means to the DCD signal of the channel through the input port means.

11. The apparatus in accordance with claim 10 wherein the UART means includes storage memory for storing received data of the transmit signal TX, including the poll address.

12. The apparatus in accordance with claim 10 wherein the control means includes a plurality of switches governed by the set signal to operate between a first mode and a second mode; wherein when in the first mode, the UART means is connected to receive RTS and TX signals from the input port means and to originate and transmit DCD and RX signals to the input port means; and wherein when in the second mode, the UART is connected to originate and transmit RTS and TX signals to the channel through the output port means and to receive DCD and RX signals from the channel through the output port means.

* * * * *